July 16, 1929.
1,720,874
O. ZERK, NOW BY JUDICIAL CHANGE OF NAME O. U. ZERK
LUBRICANT DISPENSING APPARATUS
Filed Aug. 2, 1923   2 Sheets-Sheet 1
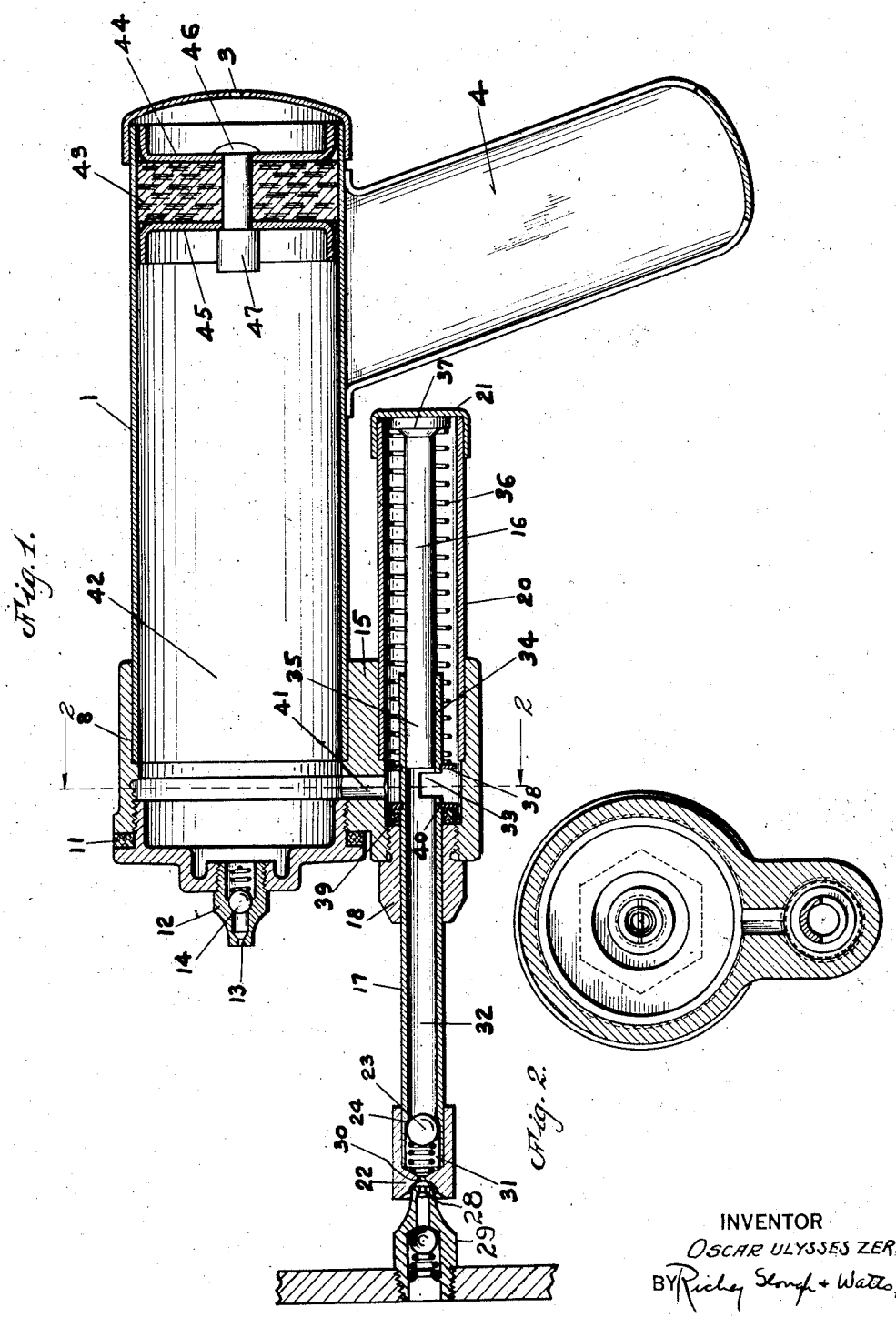
INVENTOR
OSCAR ULYSSES ZERK
BY Richey Slough + Watts,
HIS ATTORNEYS.

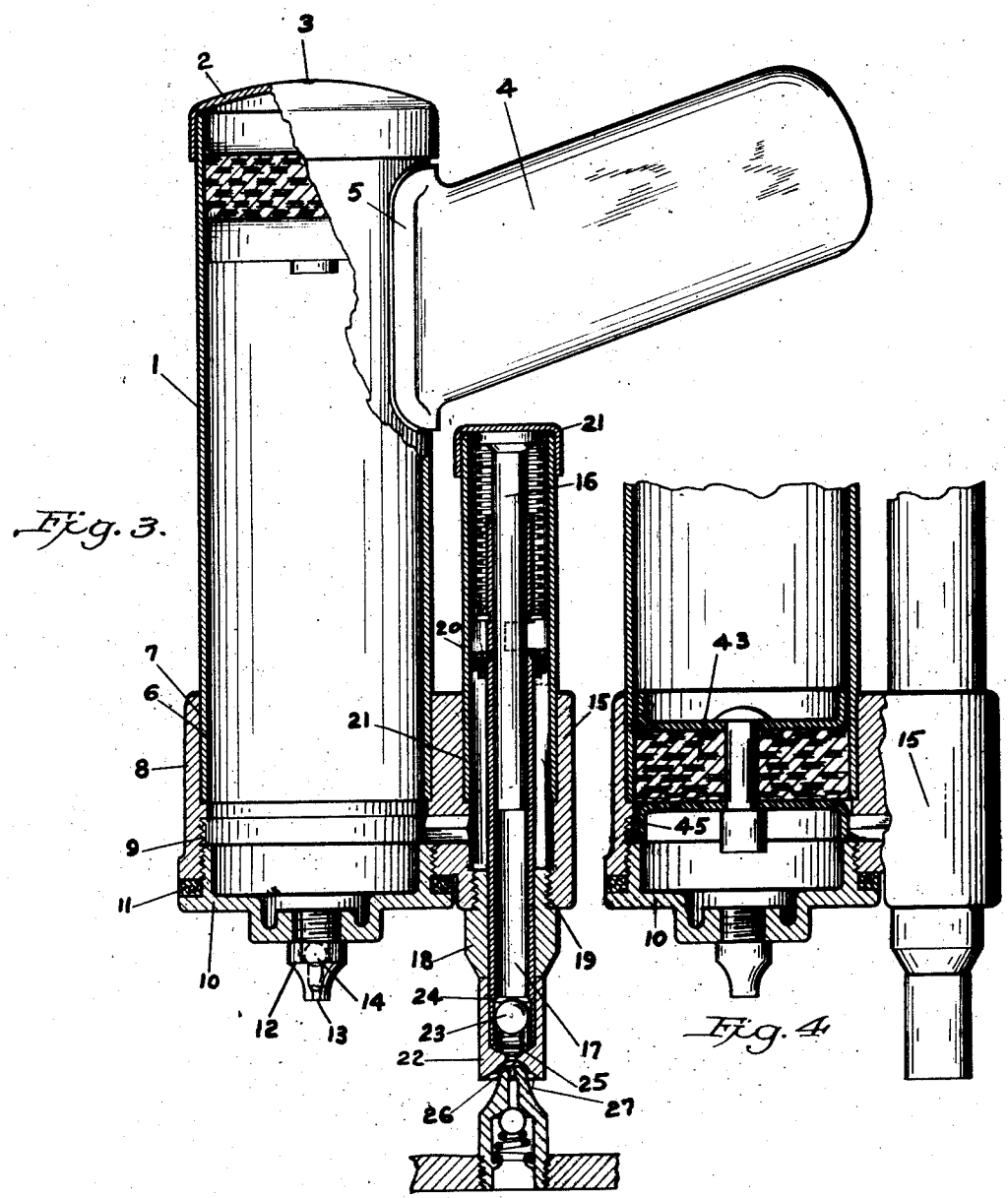

Patented July 16, 1929.

1,720,874

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE ALEMITE MANUFACTURING CORPORATION, OF CHICAGO, ILLINOIS, A CORPORATION OF DELAWARE.

LUBRICANT-DISPENSING APPARATUS.

Application filed August 2, 1923. Serial No. 655,293.

My invention relates to lubricant dispensing apparatus and particularly to that type of such dispensing apparatus which may be employed for the purpose of dispensing a liquid, plastic or solid lubricant, such as oil or grease, to a lubricant receiving element, such apparatus comprising a lubricant receptacle and lubricant ejecting apparatus associated therewith.

It is an object of my invention to provide in such a lubricant dispensing apparatus a compact unitary lubricant dispensing pistol, which can be operated while merely holding the pistol in one hand to cause forcible ejection of lubricant to a lubricant receiving element under a very high hydraulic pressure so that the lubricant will be capable of passing in to bearing surfaces located adjacent to said element, and forcing out therefrom, ahead of it, old, congealed, dirty, or gummed lubricant, the new lubricant forcibly displacing the old.

Another object of my invention is to provide a lubricant dispensing pistol of high efficiency which will be very compact, the same comprising a high pressure plunger, and a lubricant reservoir with a movable wall or follower, said plunger serving to forcibly eject a charge of lubricant at high pressure into a machine bearing, and when the pistol is operated the said follower operating to limit the lubricant containing space in the reservoir to that actually needed for the contained lubricant above, thereby eliminating admission of air into the lubricant reservoir.

Another object of my invention is to secure in an apparatus of this character, the advantages inherent in a lubricant compressor or pistol wherein lubricant is discharged merely by pressing the said compressor or pistol toward the element to be lubricated with the compressor nozzle in contact therewith.

Other objects of my invention and the invention itself will be apparent from the description of a specific embodiment thereof, in which description, reference will be had to the accompanying drawings forming a part of this specification.

Referring to the drawings:

Fig. 1 shows a longitudinal vertical medial sectional view of a lubricant dispensing apparatus embodying the principles of my invention.

Fig. 2 shows a vertical transverse sectional view on the line 2—2 of Figure 1.

Fig. 3 shows a view similar to that of Figure 1 except that the lubricant ejecting apparatus thereof is shown in fully telescoped position, a portion of the barrel and the handle attached thereto being in this figure shown in elevation.

Fig. 4 shows a sectional view of a portion of the apparatus shown in Figure 3, an adjacent portion being, however, in this view, shown in elevation. This view shows the movable wall or follower for the reservoir in the position it assumes when the supply of lubricant is nearly exhausted.

Referring now to all the different figures, in all of which like parts are indicated by like reference characters,—

At 1, I show a cylindrical barrel having an end wall or head 2 perforated at 3, said barrel having affixed to it near its breech end a handle 4, the handle flanges being secured to the barrel by electrical spot welding, or in any other well known suitable way. The forward or muzzle end 6 of the barrel 1 is driven tightly into a cylindrical opening 7, of a support 8. Said support 8 is internally threaded at 9 to admit a cap head 10 screw-threaded into the support 8, a cork gasket 11 being interposed between adjacent faces of the support 8 and the cap 10. Carried on the cap 10 is an inlet nipple 12 having an inlet opening 13 and a ball check valve 14, said nipple being provided for the purpose of charging the pistol with lubricant under pressure, whenever the supply of lubricant within the barrel 1 shall have become depleted.

Carried on an arm 15 of the support 8, I have provided a lubricant ejecting apparatus comprising a plunger piston 16 adapted to be telescoped within a lubricant charge containing tube 17. The tube 17 is journaled within a bushing 18 screw-threaded as shown at 19 into the support arm 15, said support arm containing a longitudinally extending opening therethrough, and the bushing 18 being thus secured into one end of the opening; a cylindrical tube 20 is tightly fitted into the other end of the opening.

The tube 20 has a cap 21, comprising an end wall rigidly secured thereto. The piston receiving tube 17 has a rigid lubricant dispensing nozzle 22 secured on its forward end, said nozzle comprising a valve ball 23 and valve seat 24 together with a valve spring 25 whereby the ball is normally pressed against the seat. The nozzle 22 also has a contact face 26 and an outwardly flaring inclined guiding face 27 therefore. Said guiding face is adapted to guide the contact face of a lubricant receiving nipple into contact with the nozzle contact face.

An opening 30 leads from the nozzle contact face to the valve chamber 31 which, when the ball 23 is unseated, communicates with the bore 32 of the tube 17. The tube 17 has a port opening 33, and a piston guide portion 34 disposed on the side beyond the port opening from the nozzle end of the tube 17, but in axial alignment therewith. The piston 16 has its end 35 normally disposed within the guide portion 34 of the lubricant charge containing tube 17 and the port 33 is kept open by the action of the spring 36, which forces the enlarged flanged head 37 of the piston 16 against the inner wall of the cap 21; the spring serves at the same time by engagement with the washer 38 rigidly carried on the tube 17, on the piston guide portion thereof, to press the tube 17 forwardly to cause it to project its nozzle end from the forward end of the compressor, to a position such as is shown in Fig. 1; the cork washer 39 at such time is pressed by a metal washer 40, rigidly carried on the tube 17, against the inner end of the bushing 18, and when the apparatus is not being used this cork washer or gasket prevents the loss of lubricant, as by capillary attraction when a liquid lubricant as oil is used.

A channel 41 leads from the lubricant reservoir 42 to the lubricant dispensing apparatus compartments and permits lubricant from the reservoir 42 passing through the channel 41 to flow through the port 33 into the tube 17 so as to charge or recharge the tube 17 with a charge of lubricant. Freely movable longitudinally within the barrel 1, I provide a composite piston comprising a cork piston or follower 43, and metallic clamping washers 44 and 45 with a bolt 46, having a forward extending head 47, serving to clamp said washers 44 and 45 against the said cork piston 43, and to cause its lateral expansion against the internal walls of the barrel 1. This movable wall or follower preferably has no external mechanical connections leading to it and is only movable within the barrel 1 under the influence of a difference of fluid pressure on the end walls thereof.

Having now outlined, briefly, the different parts of my improved apparatus, I will now describe the operation thereof.

Prior to putting the pistol into use, it is loaded with lubricant as by injecting the lubricant from a source of lubricant under pressure through the nipple 12, which has an inlet opening 13 and ball valve 14, the ball valve being opened by the pressure of the inflowing lubricant, and the lubricant will then fill all of the space within the receptacle chamber 42, the passages 41, the tube and chamber 32, the piston 16 and the tube 17, during the loading operation, being preferably in the positions shown in Fig. 1. At this time the port 33 opening into the chamber 32 of the tube 17 is preferably open, and lubricant therefore will fill all of the inner spaces of the compressor and nozzle until the movable piston follower 43 is forced by lubricant from a more forward position to the position shown in Fig. 1 at the rear or breech end of the barrel 1. Lubricant, after filling all of the interior spaces, will begin to flow past the ball valve 23—24, and through the nozzle opening 30, indicating to the operator that the compressor is completely loaded.

Having loaded the compressor, the ball check valves 14 and 23—24 will again be automatically closed by the power of their restoring springs. When it is desired to use the compressor to eject lubricant at high pressure into such a lubricant receptacle as the nipple 29, the contact face 26 of the nozzle 22 is brought into engagement with the rim of the nipple face, and the operator continuously holding the compressor by the handle 4 may then cause forcible ejection of the lubricant into the nipple by merely pressing the compressor forward by the handle and towards the nipple. When so pressed forward, the tube 17 will be reciprocated relative to the barrel 1, to telescope within the bushing 18 and over the plunger piston 16, the plunger piston entering the chamber 32, containing a charge of lubricant, after closing the port 33. The plunger 16 passes well into the chamber 32 and forces a charge of grease contained therein ahead of it and through the ball valve 23—24 and through the nozzle orifice 30 and into the nipple 29 through the opening in the center of the nipple end, or contact face. The nozzle contact face at such time presses tightly and closely against the circular rim of the nipple contact face, and is maintained thereagainst by the manual pressure directed by the operator against the handle of the compressor and toward the nipple to cause an effectual seal of the contacting face portions of the nozzle and nipple, against the escape of lubricant, thus at the same time making a fluid-tight joint for the passage of lubricant from the nozzle to the inner passage of the nipple, from whence it is directed to bearing surfaces adjacent the nipple to be lubricated. The telescoping of the tube 17 through the bushing 18 and over the piston 16 is accomplished against the resistance to such telescoping exerted by the spring 36, and also that due to the counter-pressure exerted by the charge of lubricant within the chamber 32 against the advancing piston end. However, the manual pressure exerted against the flanged end 37 of the piston 16 overpowers such resistance and ejection of lubricant under high fluid pressure results.

After the ejection of a charge of lubricant from the nozzle in the manner described the operator will withdraw the ejecting pressure by discontinuing the manual pressure upon the compressor handle 4, at which time the spring 36 will cause relative movement of the tube 17 and the piston 16, so that the tube 17 will be moved to the relatively extended position as shown in Fig. 1. The withdrawal of the piston 16 from the chamber 32, due to the immediate automatic closure of the valve 23—24, will create a suction in the said chamber, which, when the tube 17 regains its extended position, will be communicated through the port 33 to the body of lubricant adjacent thereto and extending through the connecting passages to the body of lubricant in the barrel 1. This will create a forward or feeding movement of the lubricant in the barrel 32 to recharge the chamber 32. This will cause a decrease of fluid pressure exerted against the forward side of the movable wall 43 which will then be moved forwardly in close contact with the body of lubricant ahead of it by the excess of atmospheric pressure on its rear side, such atmospheric pressure being communicated thereto through the opening 3 in the barrel breech end wall. This action will take place every time the lubricant pistol of my invention is operated to eject a charge of lubricant, and recharging of the chamber 32 will take place after such ejection, and in each case the movable wall or follower 43 will advance within the barrel 1 such a distance as is commensurable with the volume of lubricant ejected, until finally the movable follower 43 will take a position substantially as shown in Fig. 4, when the rim of the metal cup washer 45 will engage the rim of the cap cover 10, at which time the forward movement of the free follower will be stopped, the free flow of lubricant through the passage 41 and port 33 into the tube 17 being prevented; the operator now attempting to again use the compressor will soon find that little or no lubricant will be fed into the tube 17 and will be thus apprised that the compressor requires re-loading. The piston element 45 at the end of its forward movement is adapted to fit over the passage 41.

Although I have described the compressor of my invention and the nipple shown in connection therewith as having contact faces so shaped that the nozzle contact face is adapted to embrace the end of the nipple contact face, I may sometimes employ varying arrangements from that specifically herein illustrated and described; as for instance, I may in some cases employ a nozzle terminating in a convex, partly spherical contact face adapted to have part of its forward spherical portion projected within a nozzle having a circular opening, the edges of the opening making a tight contact with the contacting face of the nozzle, as shown in my co-pending application Serial No. 602,465, filed Nov. 21, 1922, the two arrangements being equivalents, so far as the present invention is concerned.

While I have shown the different parts of my improved lubricant pistol in different operative positions and have not actually shown the lubricant contained therein, it is understood that in operation the lubricant will be contained within the compressor as described, the same being omitted from the drawings, as is customary, for the purpose of better exposing the different operative parts.

Having now described my invention in a specific embodiment, I am aware that numerous and extensive departures may be made from the embodiment herein illustrated and described without departing from the spirit of my invention.

I claim:—

1. A lubricant compressor comprising two reservoirs having a port establishing communication therebetween, means for ejecting the contents of one reservoir, a suction actuated follower for scavenging the other reservoir, said follower having a sealing portion for covering said port when the lubricant in said other reservoir is substantially exhausted, and an injection inlet for said other reservoir for filling said compressor and thereby moving said follower to uncover said port.

2. A lubricant compressor comprising a reservoir having a port, means for withdrawing material through said port, a follower for scavenging the reservoir, said follower having a sealing portion for covering said port when the lubricant in said reservoir is substantially exhausted, and an injection inlet for said reservoir for filling said reservoir and thereby moving said follower to uncover said port.

3. A lubricant pistol comprising a barrel having a muzzle end and a breech end, a suction actuated follower in said barrel movable substantially the entire length thereof, telescopic means for ejecting lubricant from said barrel, said ejecting means being mounted parallel to and alongside said barrel, and a handle on said barrel near the breech end in line with said telescopic ejecting means.

4. A portable lubricant compressor comprising a barrel, a suction actuated follower in said barrel, telescopic means for ejecting lubricant from said barrel, said ejecting means being mounted parallel to and alongside said barrel, and a rigid handle on said barrel for operating said telescopic ejecting means.

5. A portable lubricant compressor comprising a barrel, a suction actuated follower in said barrel, and telescopic means for ejecting lubricant from said barrel, said ejecting means being mounted parallel to and alongside said barrel, said ejecting means including a slidable element projecting beyond the end of said barrel for operating said ejecting means by being forced in toward said barrel.

6. A lubricant pistol having a muzzle end and a breech end and comprising a large reservoir and a small reservoir rigidly connecting and lying side by side, said large reservoir extending beyond the breech end of said small reservoir, a pistol grip on said large reservoir behind the breech end of said small reservoir, a passage-way connecting the muzzle ends of said reservoirs, valved lubricant receiving means in the muzzle end of said large reservoir, telescopic ejection means projecting from the muzzle end of said small reservoir beyond said injection means, and a suction actuated follower for scavenging said large reservoir and covering said passage-way when said large reservoir is empty.

7. A lubricant pistol having a muzzle end and a breech end and comprising a large reservoir and a small reservoir rigidly connected and lying side by side, said large reservoir extending beyond the breech end of said small reservoir, a pistol grip on said large reservoir behind the breech end of said small reservoir, a passage-way connecting said reservoirs, and telescopic ejection means projecting from the muzzle end of said small reservoir.

8. A lubricant pistol having a muzzle end and a breech end and comprising a large reservoir and a small reservoir rigidly connected and lying side by side. a pistol grip on said large reservoir behind the breech end of said small reservoir, a passage-way connecting said reservoirs, ejection means projecting from the muzzle end of said small reservoir, and means for operating said ejection means by a forwardly directed thrust.

9. A lubricant pistol having a muzzle end and a breech end and comprising a large reservoir and a small reservoir rigidly connected and lying side by side, a pistol grip on said large reservoir, a passage-way connecting said reservoirs, and telescopic ejection means carried by said small reservoir.

10. A lubricant pistol having a muzzle end and a breech end and comprising a large reservoir and a small reservoir rigidly connected and lying side by side, a pistol grip on said large reservoir, a passage-way connecting the muzzle ends of said reservoirs, valved lubricant receiving means in the muzzle end of said large reservoir, telescopic ejection means projecting from the muzzle end of said small reservoir beyond said injection means, and a suction actuated follower for scavenging said large reservoir.

11. A lubricating compressor comprising a lubricant barrel, a handle projecting laterally from said barrel, a terminal for engaging a receiving fitting, and means for compressing lubricant operating by telescoping movement on a line passing through said handle at one side of the barrel.

12. A lubricant compressor comprising a cylinder, a sleeve telescoping in one end of said cylinder, a piston slidable in said sleeve and abutting the other end of said cylinder, a compression spring for holding said piston against the cylinder end and said sleeve protruded, abutment means on said piston forming a seat for said spring, a packing encircling said sleeve where it leaves said cylinder, and abutment means on said sleeve for seating said spring and compressing said packing.

13. A lubricant compressor comprising a reservoir, telescopic means on said reservoir projecting from one end thereof, for compressing an ejecting lubricant, said reservoir and means having a sliding joint, a packing for sealing said joint, said packing being carried by said telescopic means, and a spring for extending said telescopic means, said packing engaging said reservoir at said joint to limit the extension of said telescopic means.

14. A lubricant compressor comprising a reservoir, telescopic means on said reservoir projecting from one end thereof for compressing and ejecting lubricant, said reservoir and means having a sliding joint, a packing for seating said joint, a spring for extending said telescopic means, and means for carrying the thrust of said spring through said packing to said reservoir at said joint.

15. A portable hand operated lubricant compressor comprising a barrel, a follower for scavenging said barrel, high pressure compressing means actuated by a thrust on said barrel for withdrawing lubricant from in front of said follower and ejecting it at high pressure, and means for replenishing the supply of lubricant in said barrel between said follower and said compressing means, while both said compressing means and follower remain undisturbed in assembled operative relation.

16. A portable hand operated lubricant compressor comprising a barrel, a suction actuated follower for scavenging said barrel, high pressure compressing means for withdrawing lubricant from in front of said follower and ejecting it at high pressure, and means for replenishing the supply of lubricant in said barrel between said follower and said compressing means, while both said compressing means and follower remain undisturbed in assembled operative relation.

In testimony whereof I hereunto affix my signature this 1st day of August, 1923.

OSCAR ZERK.